United States Patent
Duan et al.

(10) Patent No.: US 9,888,416 B2
(45) Date of Patent: Feb. 6, 2018

(54) MULTI-CHANNEL PREDISTORTION METHOD AND APPARATUS

(71) Applicant: ZTE CORPORATION, Shenzhen, Guangdong Province (CN)

(72) Inventors: Yijun Duan, Shenzhen (CN); Weiming Pan, Shenzhen (CN)

(73) Assignee: ZTE Corporation, Shenzhen (CN)

(*) Notice: Subject to any disclaimer, the term of this patent is extended or adjusted under 35 U.S.C. 154(b) by 67 days.

(21) Appl. No.: 14/906,118

(22) PCT Filed: Jun. 20, 2014

(86) PCT No.: PCT/CN2014/080385
§ 371 (c)(1),
(2) Date: Jan. 19, 2016

(87) PCT Pub. No.: WO2015/007136
PCT Pub. Date: Jan. 22, 2015

(65) Prior Publication Data
US 2016/0174118 A1  Jun. 16, 2016

(30) Foreign Application Priority Data
Jul. 19, 2013  (CN) .......................... 2013 1 0305443

(51) Int. Cl.
*H04W 36/06*  (2009.01)
*H04L 25/49*  (2006.01)
*H04W 36/24*  (2009.01)

(52) U.S. Cl.
CPC ............. *H04W 36/06* (2013.01); *H04L 25/49* (2013.01); *H04W 36/24* (2013.01)

(58) Field of Classification Search
None
See application file for complete search history.

(56) References Cited

U.S. PATENT DOCUMENTS 6,314,142 B1 * 11/2001 Perthold ............... H03F 1/3247
                                                           330/149
6,462,617 B1 * 10/2002 Kim .................... H03F 1/3247
                                                           330/149

(Continued)

FOREIGN PATENT DOCUMENTS

CN       101662435 A      3/2010
CN       101710887 A      5/2010

(Continued)

OTHER PUBLICATIONS

International Search Report and Written Opinion dated Sep. 28, 2014 in PCT Patent Application No. PCT/CN2014/080385.

*Primary Examiner* — Bunjob Jaroenchonwanit
(74) *Attorney, Agent, or Firm* — Plumsea Law Group, LLC (57) ABSTRACT

A multi-channel predistortion method and apparatus are disclosed. The technical method provided in the embodiment of the present invention includes: determining a channel index of a current channel to be processed; performing handover to the current channel according to a determined channel index; collecting forward data and reverse data of the current channel, and estimating a predistortion coefficient; and performing predistortion compensation on forward data of each channel according to a corresponding predistortion coefficient. In the embodiments of the present invention, by using a jumping polling mode on a channel time, the predistortion efficiency under multiple channels is improved. In addition, by means of all channels or a plurality of channels sharing N power levels, the resource utilization rate is improved.

16 Claims, 4 Drawing Sheets

(56) References Cited

U.S. PATENT DOCUMENTS

| | | | | |
|---|---|---|---|---|
| 8,243,852 B1* | 8/2012 | Summerfield | | H04L 27/368 375/296 |
| 9,246,491 B2* | 1/2016 | Kuang | | H03M 13/091 |
| 2002/0079965 A1* | 6/2002 | Maniwa | | H03F 1/3258 330/149 |
| 2002/0080891 A1* | 6/2002 | Ahn | | H03F 1/3247 375/297 |
| 2003/0020538 A1* | 1/2003 | Kim | | H03F 1/3258 330/2 |
| 2003/0184374 A1* | 10/2003 | Huang | | H03F 1/3247 330/149 |
| 2004/0142667 A1* | 7/2004 | Lochhead | | H03F 1/3247 455/114.3 |
| 2005/0079834 A1* | 4/2005 | Maniwa | | H04L 27/368 455/114.3 |
| 2005/0111574 A1* | 5/2005 | Muller | | H03F 1/32 375/296 |
| 2006/0229036 A1* | 10/2006 | Muller | | H03F 1/3282 455/114.3 |
| 2008/0112458 A1* | 5/2008 | Wang | | G01N 25/18 374/43 |
| 2009/0252255 A1* | 10/2009 | Lee | | H03F 1/3241 375/297 |
| 2010/0039100 A1* | 2/2010 | Sun | | H03F 1/3247 324/123 R |
| 2010/0164620 A1* | 7/2010 | Hamada | | H03F 1/3247 330/149 |
| 2010/0183294 A1* | 7/2010 | Villarruel | | H04B 10/032 398/10 |
| 2012/0154038 A1* | 6/2012 | Kim | | H03F 1/3247 330/149 |
| 2013/0177105 A1* | 7/2013 | Gonikberg | | H04B 1/0475 375/296 |
| 2017/0041920 A1* | 2/2017 | Kazmi | | H04W 72/048 |

FOREIGN PATENT DOCUMENTS

| CN | 102624423 A | 8/2012 |
|---|---|---|
| KR | 20030097186 A | 12/2003 |

* cited by examiner

MULTI-CHANNEL PREDISTORTION METHOD AND APPARATUS

CROSS-REFERENCE TO RELATED APPLICATION(S)

This application is the U.S. National Phase application of PCT application number PCT/CN2014/080385 having a PCT filing date of Jun. 20, 2014, which claims priority of Chinese patent application 201310305443.7 filed on Jul. 19, 2013, the disclosures of which are hereby incorporated by reference.

TECHNICAL FIELD

The embodiments of the present invention relate to the power amplifier technology, and particularly, to a multi-channel predistortion method and apparatus.

BACKGROUND OF RELATED ART

With the rapid development of a wideband, broadband, high-speed and multi-service wireless mobile communication system, the power consumption of a signal power amplifier device in the system is increasingly higher, and to reduce the power consumption of system, increase the efficiency of power amplifier and improve the signal quality becomes an important research direction of the wireless system.

The power consumption of a bases station of the system can be reduced to a certain degree with the linearization processing technology of a power amplifier of the base station, and the digital predistortion technology is an effective processing method for the power amplifier linearization processing. By actively tracking and applying the nonlinearity reverse to the amplifier, at the peak value of saturation power, the digital predistortion makes a radio-frequency transistor linearly work, thereby improving the efficiency of the power amplifier and reducing the power consumption.

A multi-channel wireless system is to increase the system coverage through the array gain of the multi-channel antennas or reduce the output power of power amplifier of a single channel under the same coverage in a single-channel system, thereby further improving the efficiency of power amplifier and the system capacity.

At present, the multi-channel digital predistortion method has concurrent multi-channel digital predistortion methods, that is, all channels perform digital predistortion simultaneously and independently, and thus a plurality of sets of digital predistortion apparatuses and hardware equipments are required, which increases the system cost to a certain extent.

SUMMARY OF THE INVENTION

In order to solve the above technical problem, the embodiments of the present invention provide a multi-channel predistortion method and apparatus, which can improve the predistortion efficiency under multiple channels and reduce the system cost.

In order to achieve the object of the patent document, the embodiment of the present invention provides a multi-channel predistortion method, which comprises: determining a channel index of a current channel to be processed; performing handover to the current channel according to a determined channel index; collecting forward data and reverse data of the current channel, and estimating a predistortion coefficient; and performing predistortion compensation processing on forward data of each channel according to a corresponding predistortion coefficient.

Wherein, determining the channel index of the current channel to be processed comprises:
acquiring current temperature parameters of various downlink channels;
calculating a temperature difference value between a current temperature parameter and a historical temperature parameter of each channel, and selecting a channel index corresponding to a maximum temperature difference value as the channel index of the current channel.

Wherein, when the current temperature parameter is an initially recorded temperature, the historical temperature parameter is set as 0 degree.

Wherein, acquiring the current temperature parameters of the various downlink channels comprises:
monitoring power amplifier transistors of various channels through a temperature sensing device, and acquiring current temperature parameters of the various channels;
wherein, the temperature sensing device acquires the current temperature parameters of the various channels at regular time or according to a digital predistortion update cycle.

Wherein, the maximum temperature difference value corresponds to a plurality of channel indexes, and determining the channel index of the current channel to be processed comprises: selecting the channel index of the current channel according to a principle of maximum distance to a historical channel.

Wherein, determining the channel index of the current channel to be processed comprises: selecting and determining the channel index of the current channel to be processed according to a preset policy; and
the policy is determining the channel index of the current channel to be processed according to priority information of each channel, and the priority information is preset or determined according to a power size of each channel.

Wherein, performing predistortion compensation on the forward data of each channel comprises:
performing predistortion compensation processing on forward original data used for calculating instantaneous power or data of compensation units in which the forward original data are located;
wherein, the compensation units are divided according to symbols or time slots.

Alternatively, before collecting the forward data and reverse data of the current channel and estimating the predistortion coefficient, the method further comprises:
presetting a predistortion coefficient table used for storing a corresponding relationship between predistortion coefficients and corresponding index parameter levels; and
updating an estimated predistortion coefficient to a corresponding index parameter level of the predistortion coefficient table, wherein, corresponding power levels comprise corresponding or similar power levels.

Wherein, the predistortion compensation coefficient table comprises M independent level tables corresponding to each channel and N shared level tables shared by a plurality of channels; wherein, M represents that each channel has M independent level tables, N represents that all channels or a plurality of channels in the all channels share N level tables, and the sum of M and N is equal to the maximum number of power levels defined by a system;

when a power level corresponding to the predistortion coefficient belongs to independent levels, the predistortion coefficient is updated to a same level table of a corresponding channel; and if the power level corresponding to the predistortion coefficient does not belong to the independent levels, the predistortion coefficient is updated to a same level table of a shared level.

Wherein, estimating the predistortion coefficient by means of interpolation comprises:

interpolating to an M-times data rate for performing time delay compensation processing on the forward data and reverse data; or, interpolating to the M-times data rate for constructing a predistortion high-order matrix; or, taking a predistortion coefficient estimated on the M-times data rate as a predistortion coefficient on a single-time data rate.

The embodiment of the present invention further provides a multi-channel predistortion apparatus, which comprises a scheduling unit, a channel handover unit configured before predistortion compensation and a channel handover unit configured after predistortion compensation, a data collection and estimation unit and a predistortion compensation unit, wherein, the scheduling unit is configured to: determine a channel index of a current channel to be processed;

the channel handover unit is configured to: perform handover to the current channel according to a determined channel index;

the data collection and estimation unit is configured to: collect forward data and reverse data of the current channel, estimate a predistortion coefficient, and output the predistortion coefficient to the predistortion compensation unit; and the predistortion compensation unit is configured to: perform predistortion compensation processing on forward data of each channel according to a corresponding predistortion coefficient.

Wherein, the scheduling unit comprises a parameter monitoring module and a channel selection module, wherein, the parameter monitoring module is configured to: acquire current temperature parameters of various downlink channels;

the channel selection module is configured to: calculate a temperature difference value between a current temperature parameter and a historical temperature parameter of each channel, and select a channel index corresponding to a maximum temperature difference value as the channel index of the current channel.

Wherein, the parameter monitoring module is specifically configured to: at regular time or according to a digital predistortion update cycle, monitor power amplifier transistors of various channels through a temperature sensing device, to acquire the current temperature parameters of the various channels.

Wherein, the scheduling unit is specifically configured to: determine the channel index of the current channel to be processed according to priority information of each channel, here the priority information is preset or determined according to a power size of each channel.

Wherein, the data collection and estimation unit is specifically configured to: collect the forward data and reverse data of the current channel, estimate the predistortion coefficient by means of interpolation, and output the predistortion coefficient to the predistortion compensation unit;

wherein, estimating the predistortion coefficient by means of interpolation is:

interpolating to an M-times data rate for performing time delay compensation processing on the forward data and reverse data; or, interpolating to the M-times data rate for constructing a predistortion high-order matrix; or, taking a predistortion coefficient estimated on the M-times data rate as a predistortion coefficient on a single-time data rate.

Wherein, a predistortion coefficient table used for storing a corresponding relationship between predistortion coefficients and corresponding index parameter levels is preset in the predistortion compensation unit;

the predistortion compensation coefficient table comprises M independent level tables corresponding to each channel and N shared level tables shared by various channels, and when a power level corresponding to the predistortion coefficient belongs to independent levels, the predistortion coefficient is updated to a same level table of a corresponding channel, and if the power level corresponding to the predistortion coefficient does not belong to the independent levels, the predistortion coefficient is updated to a same level table of a shared level;

the predistortion compensation unit is specifically configured to: perform predistortion compensation processing on forward original data for calculating instantaneous power or data of compensation units in which the forward original data are located, wherein the compensation units are divided according to symbols or time slots.

Compared with the related art, the technical method provided in the embodiments of the present invention comprises determining a channel index of a current channel to be processed; performing handover to the current channel according to a determined channel index; collecting forward data and reverse data of the current channel, and estimating a predistortion coefficient; and performing predistortion compensation on forward data of each channel according to a corresponding predistortion coefficient. In the embodiments of the present invention, by using a jumping polling mode on a channel time, the predistortion efficiency under multiple channels is improved. In addition, by means of all channels or a plurality of channels sharing N power levels, the resource utilization rate is improved.

PREFERRED EMBODIMENTS OF THE INVENTION

The embodiments of the present invention will be further described in detail in combination with the accompanying drawings and specific embodiments below, so that the people skilled in the art can better understand the patent document and implement the patent document, but the illustrated embodiments are not a limitation to the patent document. It should be noted that the embodiments in the present invention and the characteristics in the embodiments can be combined with each other in the condition of no conflict.

Figure 1:
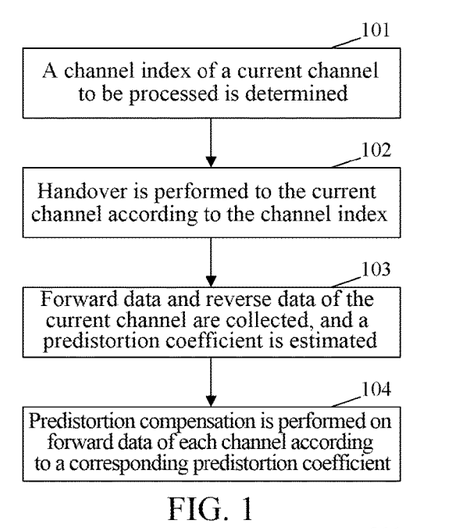
FIG. 1 is a flow chart of a multi-channel predistortion method in the embodiment of the present invention.

FIG. 1 is a flow chart of a multi-channel predistortion method in the embodiment of the present invention, and as shown in FIG. 1, the following steps are included.

In step 101, a channel index of a current channel to be processed is determined.

In the step, the channel index of the current channel to be processed can be selected and determined according to a preset policy, specifically, the preset policy is not limited in the embodiments of the present invention. For example, the channel index of the current channel to be processed is determined according to priority information of each channel, and the priority information is preset or determined according to a power size of each channel.

According to a temperature difference value between a current temperature parameter and a historical temperature parameter of each channel, a channel index corresponding to a maximum temperature difference value also can be selected as the channel index of the current channel.

In step 102, the handover is performed to the current channel according to a determined channel index.

In the step, the handover is performed to the current channel according to the channel index, so that the predistortion coefficient estimation can be performed on data of the current channel. The specific implementation of the handover between the channels belongs to conventional technical means of the people skilled in the art, which will not be repeated here.

In step 103, forward data and reverse data of the current channel are collected, and a predistortion coefficient is estimated.

Before the step, it also includes: presetting a predistortion coefficient table, which is used for storing a corresponding relationship between predistortion coefficients and corresponding index parameter levels. The step also includes:

updating an estimated predistortion coefficient to a corresponding index parameter level of the predistortion coefficient table, wherein, corresponding power levels include corresponding or similar power levels. Specifically, the predistortion compensation coefficient table can include M independent level tables corresponding to each channel and N shared level tables shared by various channels, when a power level corresponding to the predistortion coefficient belongs to independent levels, the predistortion coefficient is updated to a same level table of a corresponding channel; and if the power level corresponding to the predistortion coefficient does not belong to the independent levels, the predistortion coefficient is updated to a same level table of a shared level.

Understandably, the forward data and reverse data of the channel are required in the predistortion processing, thus after collecting the forward data and reverse data, the predistortion coefficient estimation can be performed based on the related art.

In step 104, the predistortion compensation is performed on forward data of each channel according to a corresponding predistortion coefficient.

When the predistortion compensation is performed on forward data of a certain channel, if a predistortion coefficient of a power level corresponding to the channel has not been obtained by estimation yet, the predistortion compensation can be performed by using a preset initial predistortion coefficient.

In the embodiments of the present invention, by using a jumping polling mode on a channel time, the predistortion efficiency under multiple channels is improved. In addition, by means of all channels or a plurality of channels sharing N power levels, the resource utilization rate is improved.

Figure 2:
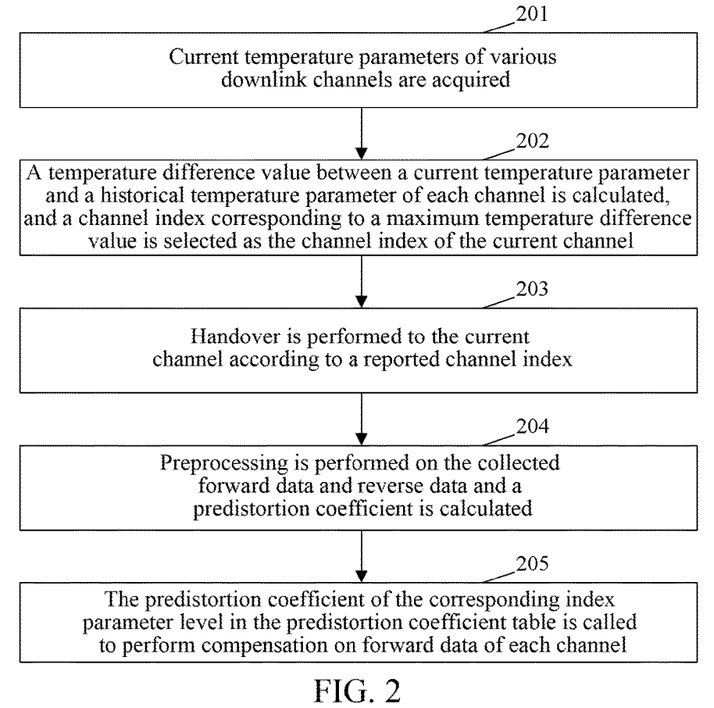
FIG. 2 is a flow chart of an embodiment of the multi-channel predistortion method in the embodiment of the present invention.

FIG. 2 is a flow chart of an embodiment of the multi-channel predistortion method in the embodiment of the present invention, and in the embodiment, descriptions will be made with an example of selecting a channel index corresponding to a maximum temperature difference value as the channel index of the current channel according to a temperature difference value between a current temperature parameter and a historical temperature parameter of each channel, and as shown in FIG. 2, the following steps are specifically included.

In step 201, current temperature parameters of various downlink channels are acquired.

The step specifically includes: monitoring a temperature of a power amplifier transistor on each channel through a temperature sensing device of each channel, and reading a temperature parameter in real time. The current temperature parameters of various channels can be acquired at regular time or according to indicator requirements of a digital predistortion update cycle, which can be implemented by a software unit or a logic unit.

In step 202, a temperature difference value between a current temperature parameter and a historical temperature parameter of each channel is calculated, and a channel index corresponding to a maximum temperature difference value is selected as the channel index of the current channel.

It is assumed that there are N channels, descriptions will be made with an ith channel as an example, and i=1:N. The step includes the following steps.

Firstly, a current temperature parameter Tnew(i) of the ith channel is read; and if the current temperature is an initially recorded temperature, a historical temperature parameter Told(i) of the ith channel is set as Told(i)=0.

Next, the historical temperature parameter Told(i) of the ith channel is read.

Then, a temperature difference value Terr(i) between the historical temperature parameter and the current temperature parameter of the ith channel is calculated, that is, Terr(i)=Tnew(i)−Told(i).

Lastly, temperature difference values Terr(i) of the N channels are compared, and a channel index corresponding to a maximum temperature difference value can be found and taken as the channel index of the current channel.

If a plurality of equal maximum temperature difference values exist, that is, a plurality of channel index values correspond to the maximum temperature difference, then a current channel index value is selected according to a principle of maximum distance to a historical channel index. The principle of maximum distance to the historical channel index mentioned here is selecting a channel with a maximum time difference as the current channel to be processed when the temperature differences are identical.

In step 203, the handover is performed to the current channel according to a reported channel index. After the handover is performed to the current channel, forward data and reverse data of the current channel can be collected.

In step 203, training sequence data of the forward data and reverse data of the current channel are collected.

In the step, a collection length can be determined according to different system standards and sampling rate characteristics. A power level for collecting is determined according to an update priority of each current power level, the level data of a power level with a high priority is preferentially collected, and then a predistortion coefficient of the power level is obtained or predistortion coefficients of other power levels that can be covered are approximately obtained.

In step 204, the preprocessing is performed on the collected forward data and reverse data and a predistortion coefficient is calculated.

The forward data mentioned in the embodiments of the present invention refer to data before digital-to-analogue conversion (DAC), and the reverse data refer to data after analogue-to-digital conversion (ADC) of a receiving channel through feedback.

Figure 3:
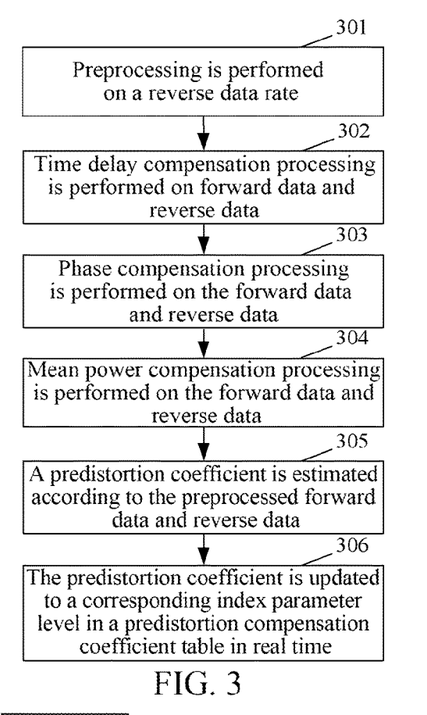
FIG. 3 is a flow chart of performing preprocessing on forward data and reverse data and calculating a predistortion coefficient in the embodiment of the present invention.

FIG. 3 is a flow chart of performing preprocessing on forward data and reverse data and calculating a predistortion coefficient in the embodiment of the present invention, and as shown in FIG. 3, the step 204 specifically includes the following steps.

In step 301, the preprocessing is performed on a reverse data rate.

Specifically, with a forward data rate as a basic standard, the reverse data rate is adjusted, to make the reverse data rate and the forward data rate identical.

In step 302, the time delay compensation processing is performed on forward data and reverse data.

Specifically, according to the system standard characteristics, one group of data therein may be fixed, and sliding correlation aligning is performed on the other group of data, wherein one group of data refers to the forward data or the reverse data. According to the system standard characteristics and data rate characteristics, it can be further interpolated to a higher data rate for performing time delay compensation, to improve the estimation and compensation accuracy. For example, it is assumed that the current data rate is Fs, M-times data rate Fs (such as 8-times rate Fs) is used to perform the time delay estimation and compensation, and a data rate after the time delay compensation is performed is sampled to the rate Fs.

In step 303, the phase compensation processing is performed on the forward data and reverse data.

Specifically, according to the system standard characteristics, one group of data therein may be fixed, and the phase of the other group of data is adjusted. Wherein the adjustment is: calculating a phase difference between the forward data and the reverse data, and performing compensation on the other group of data with the phase difference.

In step 304, the mean power compensation processing is performed on the forward data and reverse data, and a power difference is adjusted to guarantee that power means of the forward data and the reverse data are identical.

Specifically, according to the system standard characteristics, one group of data therein may be fixed, and power of the other group of data is adjusted.

In step 305, a predistortion coefficient is estimated according to the preprocessed forward data and reverse data. Here, the predistortion coefficient refers to a distortion characteristic coefficient of a power amplifier estimated through the forward data and reverse data processed in the steps 301 to 304.

Specifically, according to the system standard characteristics, one group of data therein may be selected to construct a predistortion high-order matrix, a correlation matrix and a correlation vector of the system are calculated, and the decomposition processing is performed on the correlation matrix to calculate the predistortion coefficient.

Alternatively, according to the system standard characteristics and data bandwidth characteristics, the data processing process in the step 305 can be interpolated to a higher rate for performing predistortion coefficient estimation. For example, it can be interpolated to the M-times rate for performing the predistortion high-order matrix construction, so that a predistortion high-order intermodulation bandwidth of the signal exceeds or approximates to a signal rate, and the occurrence of aliasing in high-order intermodulation signals can be avoided by interpolating to the M-times rate, and the aliasing filtering processing is performed on the M-times rate, or the predistortion coefficient estimation can be directly performed on the M-times rate, and then it is sampled to a single-time rate.

In step 306, the predistortion coefficient is updated to a corresponding index parameter level of a predistortion compensation coefficient table in real time. That is, according to a system iteration state, it is to judge that the calculated predistortion coefficient can be updated to one or a plurality of power levels therein.

In the embodiment shown in FIG. 3, the predistortion coefficient table can use a (M+N) mode. That is, the predistortion compensation coefficient table includes M independent level tables corresponding to each channel and N shared level tables shared by various channels; when a power level corresponding to the predistortion coefficient belongs to independent levels, the predistortion coefficient is updated to a same level table of a corresponding channel, and when the power level corresponding to the predistortion coefficient does not belong to the independent levels, the predistortion coefficient is updated to a same level table of a shared level. Wherein, M represents that each channel has M independent level tables, N represents that all channels or a plurality of channels in the all channels share N level tables, and the sum of M and N is equal to the maximum number of power levels defined by the system.

In step 205, the predistortion coefficient of the corresponding index parameter level in the predistortion coefficient table is called to perform predistortion compensation processing on forward data of each channel.

Specifically, instantaneous power of forward original data of a certain channel is calculated, and a predistortion coefficient of a corresponding level table is called according to the instantaneous power;

the predistortion compensation processing is performed on the forward original data or data of compensation units in which the forward original data are located according to the predistortion coefficient of the corresponding level table, and the compensation units are divided according to symbols or time slots.

The predistortion estimation and the predistortion compensation are two relatively independent processing processes, and when the data compensation is performed specifically, the judgment is made through the power level, and the predistortion compensation processing is performed through the coefficient of the power level corresponding to the index.

It is assumed that there are K channels, the channel i is taken as an example to make descriptions in the embodiment of the present invention, and the step 205 includes:

calculating the instantaneous power P of forward original data of the ith channel, and calling a coefficient of a belonged level table according to the power P; and performing the predistortion compensation processing on the forward original data or data of compensation units in which the forward original data are located according to the predistortion coefficient of the corresponding level table, wherein the compensation units are divided according to symbols or time slots.

Specifically, the predistortion compensation processing can be performed according to the system standard characteristics and data cycle characteristics.

In the multi-channel predistortion method of the embodiment of the present invention, by using a jumping polling mode on a channel time, the predistortion efficiency under multiple channels is improved. In addition, by means of all channels or a plurality of channels sharing N power levels, the resource utilization rate is improved.

Figure 4:
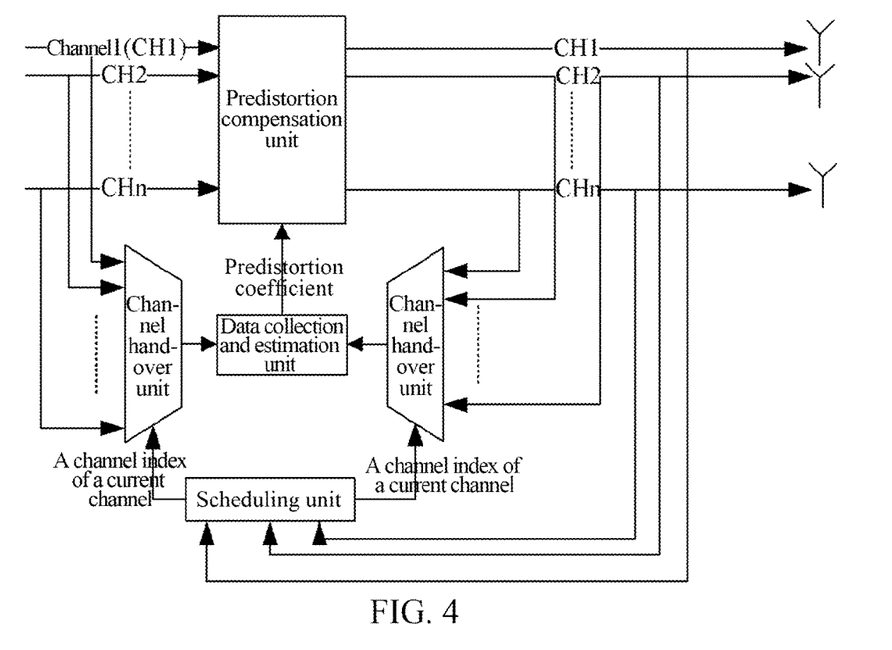
FIG. 4 is a schematic diagram of a composition structure of a multi-channel predistortion apparatus in the embodiment of the present invention.

FIG. 4 is a schematic diagram of a composition structure of a multi-channel predistortion apparatus in the embodiment of the present invention, in the embodiment of the present invention, the multi-channel predistortion apparatus is shared by multiple channels, and the multi-channel predistortion apparatus estimates and obtains a predistortion coefficient according to forward data and reverse data of an interested channel every time, and as shown in FIG. 4, a scheduling unit, a channel handover unit configured before predistortion compensation and a channel handover unit configured after predistortion compensation, a data collection and estimation unit and a predistortion compensation unit are included, wherein, the scheduling unit is configured to: determine a channel index of a current channel to be processed;

the channel handover unit is configured to: perform handover to the current channel according to the determined channel index;

the data collection and estimation unit is configured to: collect forward data and reverse data of the current channel, estimate a predistortion coefficient, and output the predistortion coefficient to the predistortion compensation unit; and the predistortion compensation unit is configured to: perform predistortion compensation processing on forward data of each channel according to a corresponding predistortion coefficient. Here, a predistortion coefficient table can be preset in the predistortion compensation unit, which is used to store a corresponding relationship between predistortion coefficients and corresponding index parameter levels. Specifically, the predistortion compensation coefficient table can include M independent level tables corresponding to each channel and N shared level tables shared by various channels, when a power level corresponding to the predistortion coefficient belongs to independent levels, the predistortion coefficient is updated to a same level table of a corresponding channel, and if the power level corresponding to the predistortion coefficient does not belong to the independent levels, the predistortion coefficient is updated to a same level table of a shared level.

Performing the predistortion compensation processing on the forward data of each channel in the predistortion compensation unit is: performing predistortion compensation processing on forward original data for calculating instantaneous power or data of compensation units in which the forward original data are located, wherein the compensation units are divided according to symbols or time slots.

Alternatively, the scheduling unit can include a parameter monitoring module and a channel selection module, wherein, the parameter monitoring module is configured to: acquire current temperature parameters of various downlink channels;

the channel selection module is configured to: calculate a temperature difference value between a current temperature parameter and a historical temperature parameter of each channel, and select a channel index corresponding to a maximum temperature difference value as the channel index of the current channel.

Alternatively, when the current temperature parameter is an initially recorded temperature, the channel selection module is further configured to set the historical temperature parameter as 0 degree.

Alternatively, the parameter monitoring module is specifically configured to: at regular time or according to a digital predistortion update cycle, monitor power amplifier transistors of various channels through a temperature sensing device, to acquire the current temperature parameters of the various channels.

When the maximum temperature difference value corresponds to a plurality of channel indexes, the channel selection module selects the channel index of the current channel according to a principle of maximum distance to a historical channel.

Wherein, the scheduling unit also can be specifically configured to: determine the channel index of the current channel to be processed according to priority information of each channel, here the priority information is preset or determined according to a power size of each channel.

Wherein, the data collection and estimation unit is specifically configured to: collect the forward data and reverse data of the current channel, estimate the predistortion coefficient by means of interpolation, and output the predistortion coefficient to the predistortion compensation unit. Wherein, estimating the predistortion coefficient by means of interpolation is:

when the predistortion coefficient is calculated, interpolating to an M-times data rate for performing time delay compensation processing on the forward data and reverse data; or, interpolating to the M-times data rate for constructing a predistortion high-order matrix; or, taking a predistortion coefficient estimated on the M-times data rate as a predistortion coefficient on a single-time data rate.

With the multi-channel predistortion apparatus of the embodiment of the present invention, through the channel handover, a plurality of channels can share the function unit for data collection and coefficient estimation, which reduces the system cost; moreover, the predistortion estimation and compensation can be preferentially performed on the channel data with a higher requirement, which improves the predistortion efficiency and power amplification efficiency; and a plurality of channels can share the level table, which saves the storage space of the predistortion coefficients.

Figure 5:
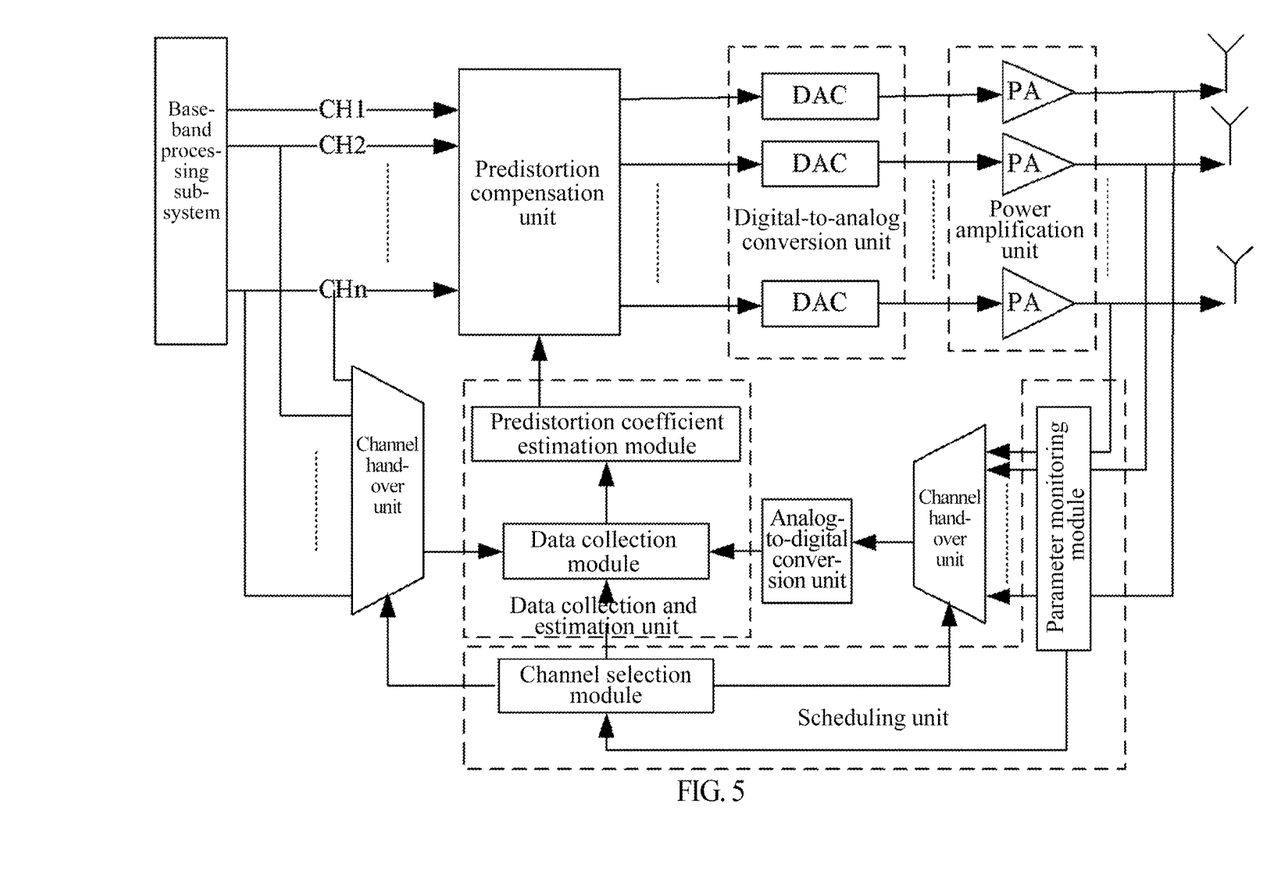
FIG. 5 is a schematic diagram of an application example of the multi-channel predistortion apparatus in the embodiment of the present invention.

FIG. 5 is a schematic diagram of an application example of the multi-channel predistortion apparatus in the embodiment of the present invention, as shown in FIG. 5, a digital-to-analogue conversion unit constituted by digital-to-analogue conversion modules (DACs) set on various channels, an analogue-to-digital conversion unit (ADC), and a power amplification unit constituted by power amplifiers (PAs) set on various channels are included, and the DAC, ADC and PA are existing devices of various channels; and a data collection and estimation unit constituted by a predistortion coefficient estimation module and an acquisition module, a scheduling unit constituted by a parameter monitoring module and a channel selection module, a predistortion compensation unit, and a channel handover unit configured before predistortion compensation and a channel handover unit configured after predistortion compensation on the channel are also included.

In the embodiment, the data collection function of the data collection and estimation unit, the predistortion compensation unit and a hardware part of the parameter monitoring module can be implemented through a field programmable gate array (FPGA), and the estimation function of the data collection and estimation unit can be implemented through a digital signal processing (DSP) unit, and the channel handover unit and the channel selection module can be controlled and implemented by a CPU, and the specific hardware implementation can be adjusted according to the relevant hardware device costs and system requirements. The multi-channel predistortion compensation in the embodiment includes:

after the system powers on, performing the initialization parameter configuration, including a predistortion parameter model, the number of power levels, the number of shared power levels, the number of dedicated power levels, initializing a predistortion coefficient table, and initializing data collection priorities of various levels of various channels;

after the system runs stably, the CPU enabling a digital predistortion function switch according to a system operation flag, and starting a predistortion processing process;

the CPU selecting a channel index of the current channel and performing channel handover, alternatively, performing the selection and handover according to a level with the highest priority and a channel priority state, and notifying the FPGA to collect data, and the FPGA storing forward data and reverse data successfully collected into an RAM, and notifying the DSP to process; and the FPGA collecting forward data and reverse data of a correct channel and correct level according to the level priority and the channel priority state. If the data collection fails, according to the system standard characteristics, here failure of one time of collection or failure of multiple times of collection can be judged here. If the collection fails, the handover can be performed to a channel with the secondary priority to perform data collection. The handover is orderly performed to channels with the secondary priority until a location where the data collection is successful.

The DSP performs the data rate consistency processing, time delay estimation and compensation, phase estimation and compensation, and power estimation and compensation processing on the forward data and reverse data.

Meanwhile, the forward data are used to construct a high-order matrix X according to the configured predistortion model parameter, a correlation matrix W and a correlation vector V of the system are calculated through the matrix X and feedback data Y, and the correlation matrix $W_{old}$=W and $V_{old}$=V of each channel are saved. Wherein, $W=X^H*X$ and $V=X^H*Y$.

If the W and V are calculated for the first time, the W and V are directly used to perform predistortion parameter estimation. If the matrix $W_{old}$ and $V_{old}$ saved in the step 3 exist in the same channel, the predistortion parameter estimation is performed after the W, V, $W_{old}$ and $V_{old}$ are smoothed. The smoothing processing is as shown in formulas (1) and (2):

$$W=\rho*W+(1-\rho)*W_{old} \quad (1)$$

$$V=\rho*V+(1-\rho)*V_{old} \quad (2)$$

in the formula (1) or (2), ρ is a smooth factor, wherein 0<ρ<1, it is set according to the system, and ρ=0.5 is defaulted. The parameter estimation predistortion coefficient η is as shown in formula (3):

$$\eta=W^{-1}*V \quad (3)$$

the calculated predistortion coefficient η is updated to a predistortion compensation coefficient table namely a LookUp Table (LUT), which is used for the FPGA performing predistortion compensation;

the LUT table can directly index the prestored predistortion coefficients through the index parameters such as power of a signal and/or a signal amplitude.

If the power level corresponding to the calculated predistortion coefficient η is within a range to which the independent levels M belong, a same level table of a corresponding channel is updated; and if the power level corresponding to the calculated predistortion coefficient η is within a range to which the shared level N belongs, a same level table in the shared level N is updated;

the above multi-channel predistortion compensation process of the embodiment is repeated, until all channels go through the predistortion calculation process, and the FPGA is started to read real-time temperature parameter of PA device of each channel, and the CPU selects a channel with a high temperature priority as current channel data according to dynamic temperature difference values to perform predistortion coefficient estimation and compensation. In the embodiment, by intelligently analyzing the monitored parameters reported by the channels, a channel on which the predistortion estimation processing needs to be performed currently is determined, forward data and reverse data of the channel are collected, predistortion parameter extraction is performed, and an extracted predistortion coefficient is used for performing digital predistortion processing on downlink data of a plurality of channels.

Figure 6:
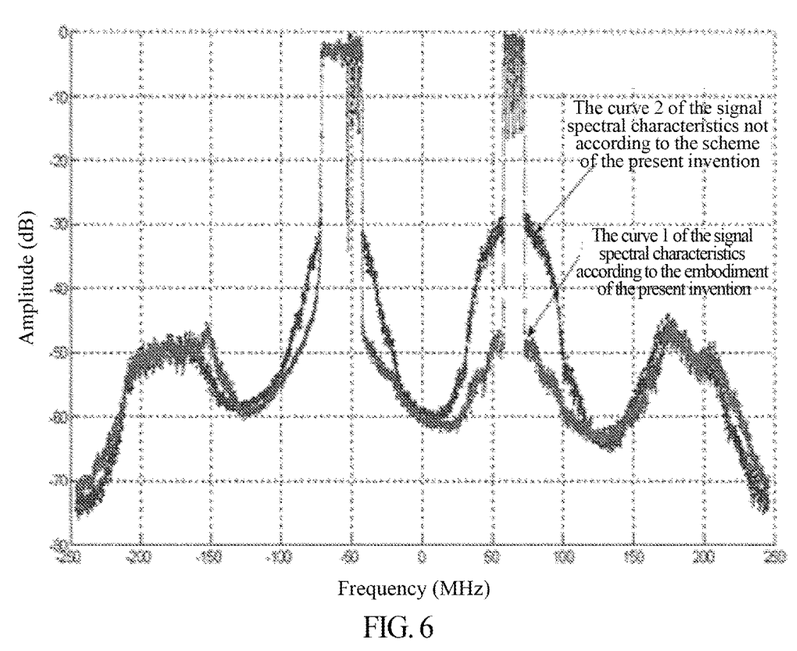
FIG. 6 is a schematic diagram of spectral characteristics compared before and after using the digital predistortion apparatus of the embodiment of the present invention.

FIG. 6 is a schematic diagram of spectral characteristics compared before and after using the digital predistortion apparatus of the embodiment of the present invention, as shown in FIG. 6. The signal is a dual-band mixed mode signal with a signal of time division synchronous code division multiple access (TDSCDMA) system plus a signal of long term evolution (LTE), and as can be seen from a comparison between a curve 1 using the signal spectral characteristics of the embodiment of the present invention and a curve 2 not using the signal spectral characteristics of the patent document shown in the FIG. 6, after performing the digital predistortion processing with the multi-channel predistortion apparatus of the embodiment of the present invention, under the rated power, the out-of-band rejection of the dual-band signal frequency spectrum can be improved about 10~20 dB, which can satisfy the out-of-band rejection protocol indicator and significantly improve the predistortion efficiency under multiple channels.

Compared to the related art, with the method and apparatus of the embodiment of the present invention, through the channel handover, a plurality of channels can share the function unit for data collection and coefficient estimation, which reduces the system cost; moreover, the predistortion estimation and compensation can be preferentially performed on the channel data with a high requirement, which improves the predistortion efficiency and power amplification efficiency; and a plurality of channels can share the level table, which saves the storage space of the predistortion coefficients.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above embodiments also can be implemented by using one or multiple integrated circuits. Correspondingly, each module/unit in the above embodiments can be implemented in a form of hardware, and also can be implemented in a form of software function module. The patent document is not limited to any combination of hardware and software in a specific form.

The modules in the system/apparatus/equipment described in the embodiments of the present invention are only an example divided according to the functions of the modules, understandably, in the case that the system/apparatus/equipment implements the same function, the people skilled in the art can give one or a plurality of other function division ways, and any one or a plurality of function modules therein can be implemented by using one function entity apparatus or unit during the specific application, and undeniably the above transformation ways are all within the protection scope of the patent document.

Apparently, the described embodiments are just a part of embodiments of the present invention but not all the embodiments. Based on the embodiments in the present invention, all other embodiments obtained by the ordinary people skilled in the art in a premise of not contributing creative labor belong to the protection scope of the patent document.

INDUSTRIAL APPLICABILITY

With the multi-channel predistortion method and apparatus provided in the embodiment of the present invention, through the channel handover, a plurality of channels can share the function unit for data collection and coefficient estimation, which reduces the system cost; moreover, the predistortion estimation and compensation can be preferentially performed on the channel data with a high requirement, which improves the predistortion efficiency and power amplification efficiency; and a plurality of channels can share the level table, which saves the storage space of the predistortion coefficients.

What is claimed is:

1. A multi-channel predistortion method, comprising:
    determining a channel index of a current channel to be processed, comprising: acquiring current temperature parameters of various downlink channels; calculating a temperature difference value between a current temperature parameter and a historical temperature parameter of each channel, and selecting a channel index corresponding to a maximum temperature difference value as the channel index of the current channel;
    performing handover to the current channel according to a determined channel index;
    collecting forward data and reverse data of the current channel, and estimating a predistortion coefficient; and
    performing predistortion compensation processing on forward data of each channel according to a corresponding predistortion coefficient.

2. The multi-channel predistortion method according to claim 1, further comprising, when the current temperature parameter is an initially recorded temperature, setting the historical temperature parameter as 0 degree.

3. The multi-channel predistortion method according to claim 1, wherein, acquiring the current temperature parameters of various downlink channels comprises:
    monitoring power amplifier transistors of various channels through a temperature sensing device, and acquiring current temperature parameters of various channels;
    wherein, the temperature sensing device acquires the current temperature parameters of various channels at regular time or according to a digital predistortion update cycle.

4. The multi-channel predistortion method according to claim 1, wherein, the maximum temperature difference value corresponds to a plurality of channel indexes, and determining the channel index of the current channel to be processed comprises: selecting the channel index of the current channel according to a principle of maximum distance to a historical channel.

5. The multi-channel predistortion method according to claim 1, wherein, determining the channel index of the current channel to be processed comprises: selecting and determining the channel index of the current channel to be processed according to a preset policy; and
    the policy is determining the channel index of the current channel to be processed according to priority information of each channel, and the priority information is preset or determined according to a power size of each channel.

6. The multi-channel predistortion method according to claim 1, wherein, performing predistortion compensation on the forward data of each channel comprises:
    performing predistortion compensation processing on forward original data used for calculating instantaneous power or data of compensation units in which the forward original data are located;
    wherein, dividing the compensation units according to symbols or time slots.

7. The multi-channel predistortion method according to claim 1, before collecting the forward data and reverse data of the current channel, and estimating the predistortion coefficient, further comprising:
    presetting a predistortion coefficient table used for storing a corresponding relationship between predistortion coefficients and corresponding index parameter levels; and
    updating the estimated predistortion coefficient to a corresponding index parameter level of the predistortion coefficient table, wherein, corresponding power levels comprise corresponding or similar power levels.

8. The multi-channel predistortion method according to claim 7, wherein, the predistortion compensation coefficient table comprises M independent level tables corresponding to each channel and N shared level tables shared by a plurality of channels; wherein, M represents that each channel has M independent level tables, N represents that all channels or a plurality of channels in all channels share N level tables, and the sum of M and N is equal to the maximum number of power levels defined by a system;
    when a power level corresponding to the predistortion coefficient belongs to independent levels, the predistortion coefficient is updated to a same level table of a corresponding channel; and if the power level corresponding to the predistortion coefficient does not belong to the independent levels, the predistortion coefficient is updated to a same level table of a shared level.

9. The multi-channel predistortion method according to claim 7, wherein, estimating the predistortion coefficient comprises:
    interpolating to an M-times data rate for performing time delay compensation processing on the forward data and reverse data; or,
    interpolating to the M-times data rate for constructing a predistortion high-order matrix; or, taking a predistortion coefficient estimated on the M-times data rate as a predistortion coefficient on a single-time data rate.

10. A multi-channel predistortion apparatus, comprising at least one processor executing a scheduling unit, a channel handover unit configured before predistortion compensation and a channel handover unit configured after predistortion compensation, a data collection and estimation unit and a predistortion compensation unit, wherein,
the scheduling unit is configured to: determine a channel index of a current channel to be processed;
the channel handover unit is configured to: perform handover to the current channel according to a determined channel index;
the data collection and estimation unit is configured to: collect forward data and reverse data of the current channel, estimate a predistortion coefficient, and output the predistortion coefficient to the predistortion compensation unit; and
the predistortion compensation unit is configured to: perform predistortion compensation processing on forward data of each channel according to a corresponding predistortion coefficient;
wherein, the scheduling unit comprises a parameter monitoring module and a channel selection module, wherein,
the parameter monitoring module is configured to: acquire current temperature parameters of various downlink channels;
the channel selection module is configured to: calculate a temperature difference value between a current temperature parameter and a historical temperature parameter of each channel, and select a channel index corresponding to a maximum temperature difference value as the channel index of the current channel.

11. The multi-channel predistortion apparatus according to claim 10, wherein, the parameter monitoring module is specifically configured to: at regular time or according to a digital predistortion update cycle, monitor power amplifier transistors of various channels through a temperature sensing device, to acquire the current temperature parameters of various channels.

12. The multi-channel predistortion apparatus according to claim 10, wherein, the data collection and estimation unit is specifically configured to: collect the forward data and reverse data of the current channel, estimate the predistortion coefficient, and output the predistortion coefficient to the predistortion compensation unit;
wherein, estimating the predistortion coefficient includes:
interpolating to an M-times data rate for performing time delay compensation processing on the forward data and reverse data; or,
interpolating to the M-times data rate for constructing a predistortion high-order matrix; or,
taking a predistortion coefficient estimated on the M-times data rate as a predistortion coefficient on a single-time data rate.

13. The multi-channel predistortion apparatus according to claim 10, wherein, a predistortion coefficient table used for storing a corresponding relationship between predistortion coefficients and corresponding index parameter levels is preset in the predistortion compensation unit;

the predistortion compensation coefficient table comprises M independent level tables corresponding to each channel and N shared level tables shared by various channels, when a power level corresponding to the predistortion coefficient belongs to independent levels, the predistortion coefficient is updated to a same level table of a corresponding channel, and if the power level corresponding to the predistortion coefficient does not belong to the independent levels, the predistortion coefficient is updated to a same level table of a shared level;
the predistortion compensation unit is specifically configured to: perform predistortion compensation processing on forward original data for calculating instantaneous power or data of compensation units in which the forward original data are located, wherein the compensation units are divided according to symbols or time slots.

14. The multi-channel predistortion apparatus according to claim 10, wherein, the scheduling unit is also specifically configured to: determine the channel index of the current channel to be processed according to priority information of each channel, here the priority information is preset or determined according to a power size of each channel.

15. The multi-channel predistortion apparatus according to claim 14, wherein, the data collection and estimation unit is specifically configured to: collect the forward data and reverse data of the current channel, estimate the predistortion coefficient, and output the predistortion coefficient to the predistortion compensation unit;
wherein, estimating the predistortion coefficient includes:
interpolating to an M-times data rate for performing time delay compensation processing on the forward data and reverse data; or,
interpolating to the M-times data rate for constructing a predistortion high-order matrix; or,
taking a predistortion coefficient estimated on the M-times data rate as a predistortion coefficient on a single-time data rate.

16. The multi-channel predistortion apparatus according to claim 14, wherein, a predistortion coefficient table used for storing a corresponding relationship between predistortion coefficients and corresponding index parameter levels is preset in the predistortion compensation unit;
the predistortion compensation coefficient table comprises M independent level tables corresponding to each channel and N shared level tables shared by various channels, when a power level corresponding to the predistortion coefficient belongs to independent levels, the predistortion coefficient is updated to a same level table of a corresponding channel, and if the power level corresponding to the predistortion coefficient does not belong to the independent levels, the predistortion coefficient is updated to a same level table of a shared level;
the predistortion compensation unit is specifically configured to: perform predistortion compensation processing on forward original data for calculating instantaneous power or data of compensation units in which the forward original data are located, wherein the compensation units are divided according to symbols or time slots.

* * * * *